US010067600B2

(12) United States Patent
Liu et al.

(10) Patent No.: US 10,067,600 B2
(45) Date of Patent: Sep. 4, 2018

(54) TOUCH DISPLAY PANEL

(71) Applicant: Innolux Corporation, Miao-Li County (TW)

(72) Inventors: Yu-Tsung Liu, Miao-Li County (TW); Te-Yu Lee, Miao-Li County (TW); I-Che Lee, Miao-Li County (TW); Hsing-Yi Liang, Miao-Li County (TW); Hui-Ching Yang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 112 days.

(21) Appl. No.: 15/355,028

(22) Filed: Nov. 17, 2016

(65) Prior Publication Data

US 2017/0205941 A1    Jul. 20, 2017

(30) Foreign Application Priority Data

Jan. 18, 2016   (CN) .......................... 2016 1 0033380

(51) Int. Cl.
*G06F 3/041* (2006.01)
(52) U.S. Cl.
CPC .......... *G06F 3/0416* (2013.01); *G06F 3/0412* (2013.01)

(58) Field of Classification Search
CPC ............................. G06F 3/0412; G06F 3/0416
See application file for complete search history.

(56) References Cited

U.S. PATENT DOCUMENTS

| | | | | |
|---|---|---|---|---|
| 2006/0201931 A1* | 9/2006 | Lee | ...................... | G02F 1/13338 219/497 |
| 2009/0200088 A1* | 8/2009 | Chuang | .................. | G06F 3/0412 178/18.01 |
| 2012/0001865 A1* | 1/2012 | Chen | ...................... | G06F 3/0412 345/174 |
| 2013/0342500 A1* | 12/2013 | Huang | .................. | G06F 3/0416 345/174 |
| 2017/0061877 A1* | 3/2017 | Lee | ...................... | G09G 3/3233 |

\* cited by examiner

*Primary Examiner* — Dmitriy Bolotin
(74) *Attorney, Agent, or Firm* — JCIPRNET (57) ABSTRACT

The disclosure provides a touch display panel. A scan line enters a display mode and a touch mode in a scan period. In the display mode, the scan line receives a first voltage to turn off a switch unit and enable a pixel unit to receive a pixel voltage signal from a first signal transmission line; and in the touch mode, the scan line receives a second voltage to turn on the switch unit and disable the corresponding pixel unit to stop receiving the pixel voltage signal, such that a sensing pixel unit outputs a touch sensing signal to the first signal transmission line through the switch unit, wherein the first voltage is greater than the second voltage. In the disclosure, an aperture ratio of the touch display panel is improved efficiently to meet the requirement of narrow border design of the touch display panel.

13 Claims, 5 Drawing Sheets

TOUCH DISPLAY PANEL

CROSS-REFERENCE TO RELATED APPLICATION

This application claims the priority benefit of Chinese application serial no. 201610033380.8, filed on Jan. 18, 2016. The entirety of the above-mentioned patent application is hereby incorporated by reference herein and made a part of this specification.

BACKGROUND OF THE INVENTION

Field of the Invention

The disclosure relates to a display apparatus and particularly relates to a touch display panel.

Description of Related Art

Generally, a touch display panel includes a plurality of display units and a plurality of touch units, wherein the display units may constitute a display region and the touch units may be built in the touch display panel. Based on different sensing types, touch units may be generally categorized into a resistive touch unit, a capacitive touch unit, an optical touch unit, an acoustic-wave touch unit, and an electromagnetic touch unit. When the user touches the touch display panel with his finger or a stylus, the touch unit on the touched position has a change in electrical properties, such as capacitance, current, resistance, and so on. Such change in electrical properties will be converted into an electronic signal to be processed for outputting an appropriate command to operate an electronic device.

The touch display panel has a display region and a peripheral region. In addition to a pixel array for displaying images, a touch sensing array is also disposed in the display region for sensing a touch event. The scan line and data transmission line for driving the pixel array and the scan line and sensing signal transmission line for driving the touch sensing array are disposed separately. For this reason, the touch display panel does not have a favorable aperture ratio. Besides, in order to dispose a large number of signal transmission lines, a certain area of the peripheral region of the touch display panel is used. As a result, it is difficult to meet the requirement of narrow border design of the touch display panel.

SUMMARY OF THE INVENTION

The disclosure provides a touch display panel, which efficiently improves an aperture ratio of the touch display panel and meets the requirement of narrow border design of the touch display panel.

The touch display panel of the disclosure includes a scan line, a first signal transmission line, a pixel unit, and a touch sensing unit. The pixel unit is coupled to the scan line and the first signal transmission line. The touch sensing unit is coupled to the scan line and the pixel unit, and includes a switch unit and a sensing pixel unit. A control end of the switch unit is coupled to the scan line and the pixel unit. The sensing pixel unit is coupled to the scan line and the switch unit and senses a touch operation to generate a touch sensing signal, wherein the scan line enters a display mode and a touch mode in a scan period. The scan line receives a first voltage in the display mode to turn off the switch unit and enable the pixel unit to receive a pixel voltage signal from the first signal transmission line, and the scan line receives a second voltage in the touch mode to turn on the switch unit and disable the pixel unit to stop receiving the pixel voltage signal, such that the sensing pixel unit outputs the touch sensing signal to the first signal transmission line through the switch unit. The first voltage is greater than the second voltage.

In an embodiment of the disclosure, the switch unit includes a P-type transistor, a gate of the P-type transistor is coupled to the scan line, a source of the P-type transistor is coupled to the sensing pixel unit, and a drain of the P-type transistor is coupled to the first signal transmission line.

In an embodiment of the disclosure, the sensing pixel unit includes a reset unit and a sensing unit. The reset unit is coupled to the scan line. The sensing unit is coupled to the reset unit and the switch unit and senses the touch operation to generate the touch sensing signal. The reset unit resets the sensing unit when the scan line receives the first voltage.

In an embodiment of the disclosure, the reset unit includes a first sensing N-type transistor, a gate of the first sensing N-type transistor is coupled to the scan line, a drain of the first sensing N-type transistor is coupled to a resetting voltage, and a source of the first sensing N-type transistor is coupled to the sensing unit. The first sensing N-type transistor is turned on to output the resetting voltage to reset the sensing unit when the scan line receives the first voltage.

In an embodiment of the disclosure, the sensing unit includes a sensing capacitor, a light diode, and a second sensing N-type transistor. The light diode is connected in parallel with the sensing capacitor between the source of the first sensing N-type transistor and a common voltage. A gate of the second sensing N-type transistor is coupled to the source of the first sensing N-type transistor, a drain of the second sensing N-type transistor is coupled to the switch unit, and a source of the second sensing N-type transistor is coupled to a reference voltage.

In an embodiment of the disclosure, the scan line further receives a third voltage after receiving the first voltage in the display mode and receives the third voltage after receiving the second voltage in the touch mode. The third voltage is for turning off the first sensing N-type transistor, turning off the switch unit, and disabling the pixel unit to stop receiving the pixel voltage signal.

In an embodiment of the disclosure, the pixel unit includes a first sub-pixel unit that includes a first pixel N-type transistor, a first liquid crystal capacitor, and a first storage capacitor. A gate of the first pixel N-type transistor is coupled to the scan line and a drain of the first pixel N-type transistor is coupled to the first signal transmission line. The first storage capacitor is connected in parallel with the first liquid crystal capacitor between a source of the first pixel N-type transistor and a common voltage.

In an embodiment of the disclosure, the touch display panel further includes a second signal transmission line and a third signal transmission line. The pixel unit further includes a second sub-pixel unit and a third sub-pixel unit. The second sub-pixel unit includes a second pixel N-type transistor, a second liquid crystal capacitor, and a second storage capacitor. A gate of the second pixel N-type transistor is coupled to the scan line and a drain of the second pixel N-type transistor is coupled to the second signal transmission line. The second storage capacitor connected in parallel with the second liquid crystal capacitor between a source of the second pixel N-type transistor and the common voltage. The third sub-pixel unit includes a third pixel N-type transistor, a third liquid crystal capacitor, and a third storage capacitor. A gate of the third pixel N-type transistor is coupled to the scan line and a drain of the third pixel N-type transistor is coupled to the third signal transmission line. The third storage capacitor connected in parallel with the third liquid crystal capacitor between a source of the third pixel N-type transistor and the common voltage.

In an embodiment of the disclosure, the sensing pixel unit, the first sub-pixel unit, the second sub-pixel unit, and the third sub-pixel unit occupy equal areas respectively on the touch display panel.

In an embodiment of the disclosure, the sensing pixel unit, the first sub-pixel unit, the second sub-pixel unit, and the third sub-pixel unit occupy unequal areas respectively on the touch display panel.

In an embodiment of the disclosure, an area of the sensing pixel unit is smaller than an area of one of the first sub-pixel unit, the second sub-pixel unit, and the third sub-pixel unit.

In an embodiment of the disclosure, the sensing pixel unit is disposed on the first sub-pixel unit, the second sub-pixel unit, and the third sub-pixel unit to respectively cover a part of each of the first sub-pixel unit, the second sub-pixel unit, and the third sub-pixel unit.

In an embodiment of the disclosure, the first voltage is a positive voltage and the second voltage is a negative voltage.

Based on the above, the scan line enters the display mode and the touch mode in the scan period. In the display mode, the scan line receives the first voltage to turn off the switch unit and enable the pixel unit to receive the pixel voltage signal from the first signal transmission line; and in the touch mode, the scan line receives the second voltage to turn on the switch unit and disable the corresponding pixel unit to stop receiving the pixel voltage signal, such that the sensing pixel unit outputs the touch sensing signal to the first signal transmission line through the switch unit, wherein the first voltage is greater than the second voltage. Accordingly, the pixel voltage signal and the touch sensing signal are both transmitted through the first signal transmission line, so as to efficiently and significantly improve the aperture ratio of the touch display panel and meet the requirement of narrow border design of the touch display panel.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
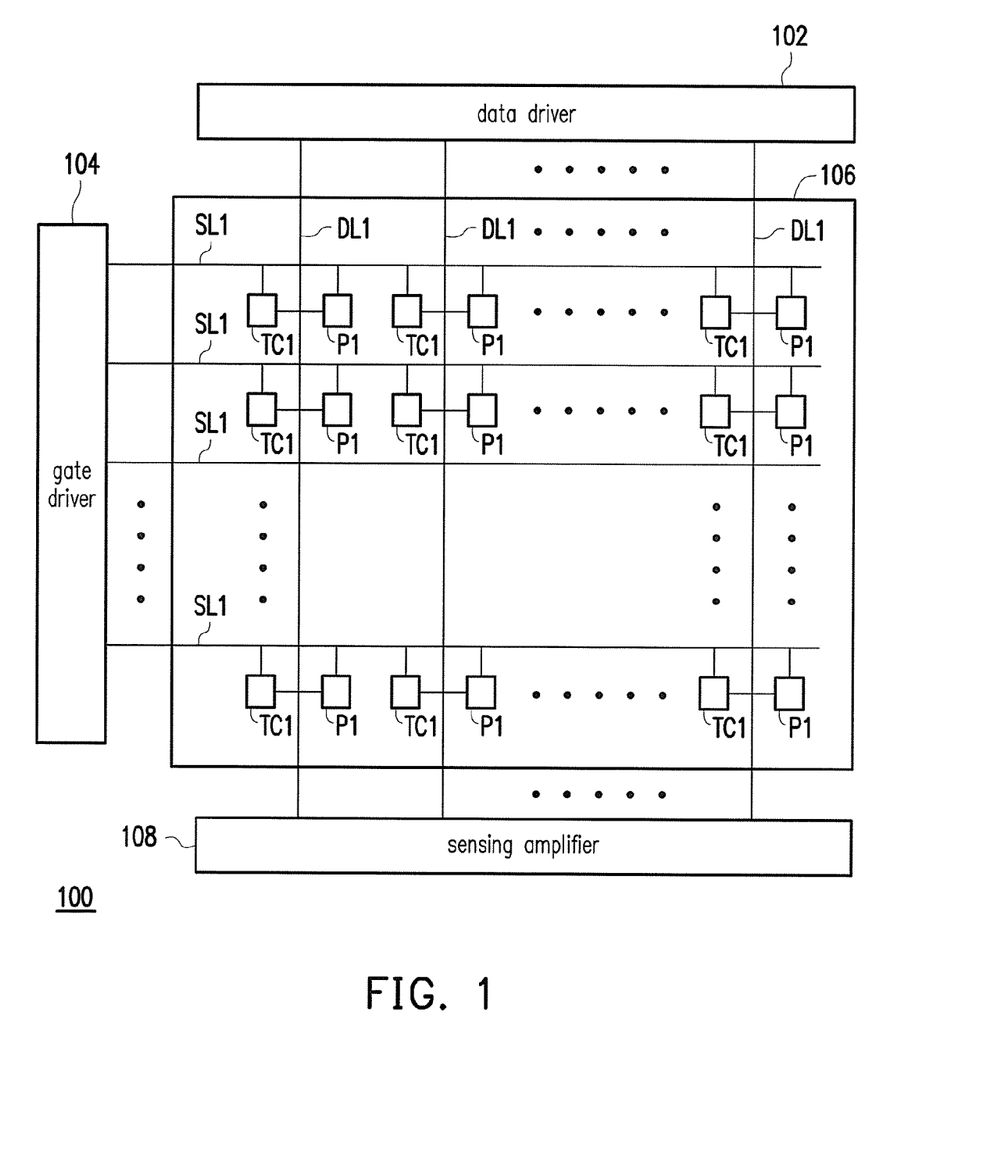
FIG. 1 is a schematic diagram of a touch display apparatus according to an embodiment of the disclosure.

FIG. 1 is a schematic diagram of a touch display apparatus according to an embodiment of the disclosure. Please refer to FIG. 1. A touch display apparatus 100 includes a data driver 102, a gate driver 104, a touch display panel 106, and a sensing amplifier 108, wherein the touch display panel 106 is coupled to the data driver 102, the gate driver 104, and the sensing amplifier 108. The touch display panel 106 may be an OLED (Organic Light Emitting Diode) display panel or a liquid crystal display panel, for example. Nevertheless, the disclosure is not limited thereto. Specifically, the touch display panel 106 includes a plurality of scan lines SL1, a plurality of signal transmission lines DL1, a plurality of pixel units P1, and a plurality of touch sensing units TC1, wherein the scan lines SL1 and the signal transmission lines DL1 are disposed to intersect one another on the touch display panel 106, and the pixel units P1 are arranged as an array on the touch display panel 106 and are respectively coupled to the corresponding scan lines SL1 and signal transmission lines DL1. The touch sensing units TC1 are also arranged as an array on the touch display panel 106 and are respectively coupled to the corresponding scan lines SL1. The touch sensing unit TC1 and the corresponding pixel unit P1 are coupled to the same signal transmission line. The scan lines SL1 are driven sequentially, such that the pixel units P1 on each scan line SL1 respectively receive a pixel voltage signal from the data driver 102 through the corresponding signal transmission lines DL1 in a scan period of the scan line to display an image and such that the touch sensing units TC1 on each scan line SL1 respectively output the detected touch sensing signal to the sensing amplifier 108 through the corresponding signal transmission lines DL1 so as to amplify the touch sensing signal and output the same to a rear-end circuit for determining a touched position.

Figure 2:
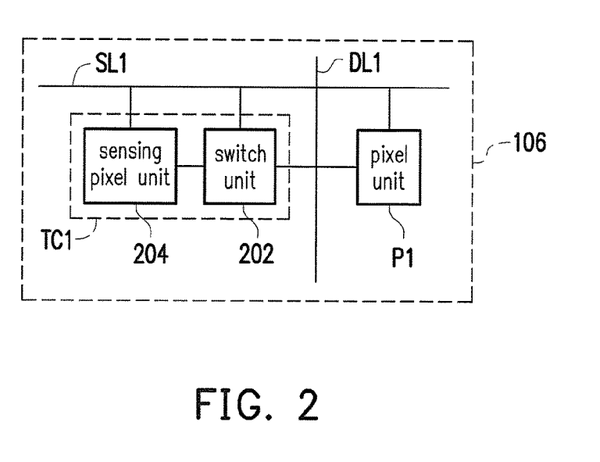
FIG. 2 is a schematic diagram of a touch display panel according to an embodiment of the disclosure.

Specifically, the touch display panel 106 may be embodied as shown in FIG. 2, for example. To facilitate the description, FIG. 2 only illustrates one touch sensing unit TC1 and one pixel unit P1, but it should be noted that the actual application of the disclosure is not limited thereto. In this embodiment, the touch sensing unit TC1 includes a switch unit 202 and a sensing pixel unit 204, wherein the switch unit 202 is coupled to the scan line SL1 and the signal transmission line DL1, and the sensing pixel unit 204 is coupled to the scan line SL1 and the switch unit 202. A control end of the switch unit 202 receives a driving voltage from the scan line SL1 to change a conduction state thereof. The sensing pixel unit 204 senses a touch operation (performed by a user's finger or an input tool, such as a stylus, for example) to generate the touch sensing signal accordingly and transmits the touch sensing signal to the signal transmission line DL1 when the switch unit 202 is turned on. In addition, the scan line SL1 enters a display mode and a touch mode in the scan period, wherein the scan line SL1 receives a first voltage in the display mode to turn off the switch unit 202 and enable the pixel unit P1 to receive the pixel voltage signal from the signal transmission line DL1. In the touch mode, the scan line SL1 receives a second voltage to turn on the switch unit 204 and disable the pixel unit P1, such that the pixel unit P1 does not receive the pixel voltage signal. At the moment, the sensing pixel unit may output the touch sensing signal to the signal transmission line DL1 through the switch unit 202 for the sensing amplifier 108 and the rear-end circuit to process the touch sensing signal and determine the touched position, wherein the first voltage is greater than the second voltage.

Figure 3:
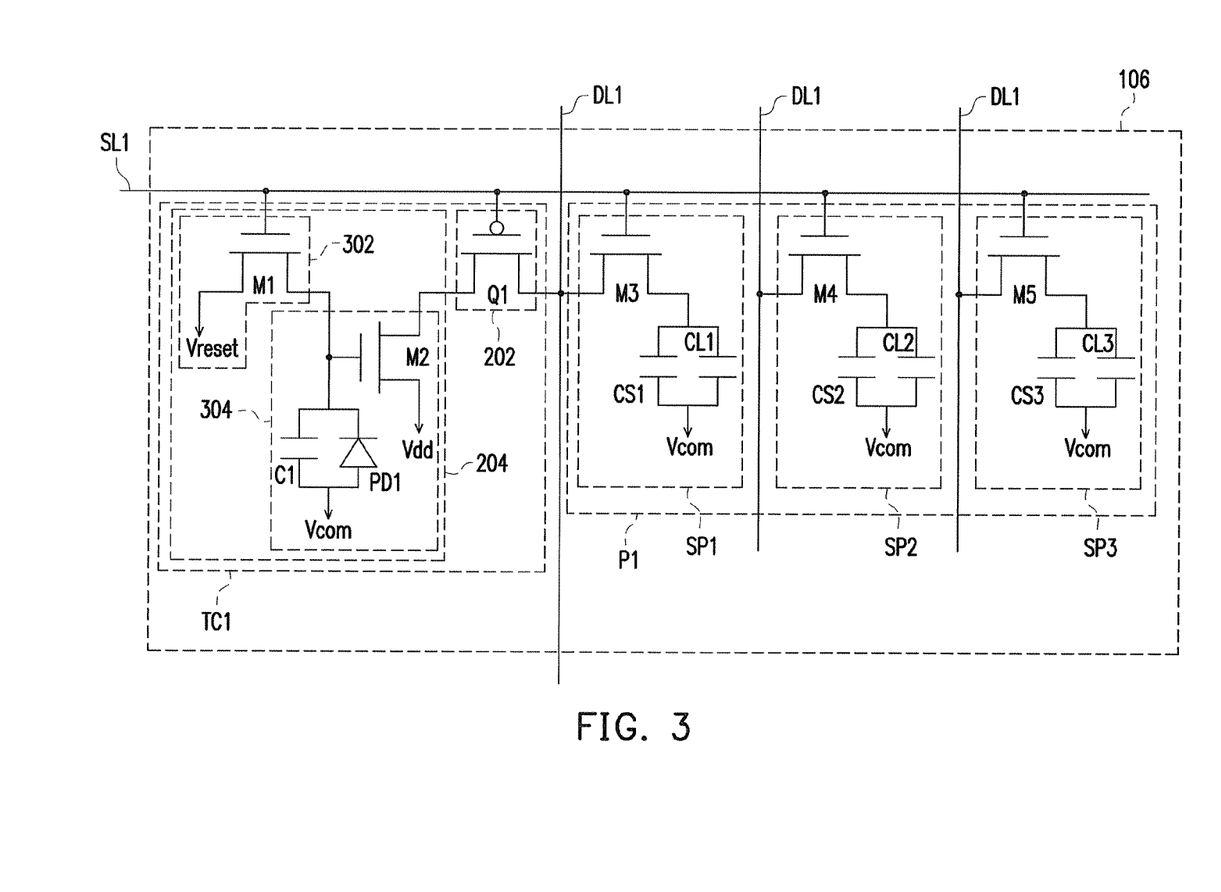
FIG. 3 is a schematic diagram of a touch display panel according to another embodiment of the disclosure.

FIG. 3 is a schematic diagram of the touch display panel according to another embodiment of the disclosure. Please refer to FIG. 3. Specifically, the touch display panel 106 of FIG. 2 may be embodied as shown in FIG. 3, for example. In this embodiment, the switch 202 includes a P-type transistor Q1, wherein a gate of the P-type transistor Q1 is coupled to the scan line SL1, and a source and a drain of the P-type transistor Q1 are coupled to the sensing pixel unit 204 and the signal transmission line DL1 respectively. Moreover, the sensing pixel unit 204 includes a reset unit 302 and a sensing unit 304, wherein the reset unit is coupled to the scan line SL1 and the sensing unit 304 is coupled to the reset unit 302 and the switch unit 202. The sensing unit 304 may sense the touch operation and generate the touch sensing signal accordingly to the switch unit 202. The reset unit may reset a sensed value of the sensing unit 304 when the scan line SL1 receives the first voltage, such that when the sensing unit 304 senses a next touch operation, the sensed value of the outputted touch sensing signal is not affected by the previous sensed value, thereby preventing erroneous determination of the touched position.

In this embodiment, the reset unit 302 is implemented by a first sensing N-type transistor M1, and the sensing unit 304 is implemented by a second sensing N-type transistor M2, a sensing capacitor C1, and a light diode PD1, for example. A gate of the first sensing N-type transistor M1 is coupled to the scan line SL1, a drain of the first sensing N-type transistor M1 is coupled to a resetting voltage Vreset, and a source of the first sensing N-type transistor M1 is coupled to a gate of the second sensing N-type transistor M2. The sensing capacitor C1 and the light diode in the sensing unit 304 are connected in parallel between the gate of the second sensing N-type transistor M2 and a common voltage Vcom, and a source and a drain of the second sensing N-type transistor M2 are respectively coupled to a reference voltage Vdd and the switch unit 202 (the source of the P-type transistor Q1). In addition, the pixel unit P1 of this embodiment includes sub-pixel units SP1, SP2, and SP3 respectively for displaying red, green, and blue, for example. Each of the sub-pixel units includes a pixel N-type transistor (M3, M4, M5), a storage capacitor (CS1, CS2, CS3), and a liquid crystal capacitor (CL1, CL2, CL3). In the sub-pixel unit SP1, a gate of the first pixel N-type transistor M3 is coupled to the scan line SL1, a drain of the first pixel N-type transistor M3 is coupled to the corresponding signal transmission line DL1, a source of the first pixel N-type transistor M3 is coupled to an end of the storage capacitor CS1 and an end of the liquid crystal capacitor CL1, and another end of the storage capacitor CS1 and another end of the liquid crystal capacitor CL1 are coupled to the common voltage Vcom. The coupling relationships among the transistors, storage capacitors, and liquid crystal capacitors of the sub-pixel unit SP2 and the sub-pixel unit SP3 are similar to that of the sub-pixel unit SP1 and therefore are not repeated hereinafter.

It should be noted that the disclosure of the embodiment of FIG. 3 is not intended to limit the number of the sub-pixel units included in the pixel unit P1. In other embodiments, the pixel unit P1 may include fewer or more sub-pixel units. Moreover, the sub-pixel unit that is coupled to the signal transmission line with the touch sensing unit TC1 may be the sub-pixel unit SP2 or the sub-pixel unit SP3 and is not necessarily the sub-pixel unit SP1.

Figure 4:
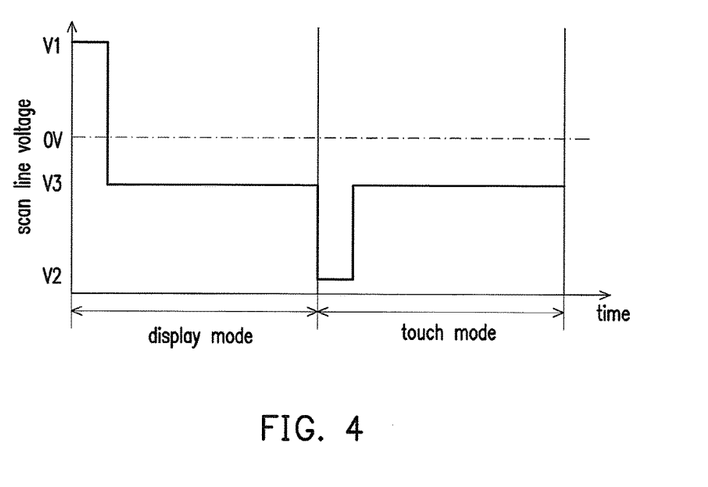
FIG. 4 is a schematic diagram of a scan line voltage according to an embodiment of the disclosure.

FIG. 4 is a schematic diagram of a scan line voltage according to an embodiment of the disclosure. Please refer to FIG. 3 and FIG. 4. As shown in FIG. 4, the scan line SL1 enters the display mode first in the scan period. During the display mode, the scan line SL1 first receives a first voltage V1, which has a voltage value greater than 0 and may turn on the first sensing N-type transistor M1, the pixel N-type transistor M3, the pixel N-type transistor M4, and the pixel N-type transistor M5, and turns off the P-type transistor Q1. At the moment, the resetting voltage Vreset may be transmitted to the gate of the second sensing N-type transistor M2 through the first sensing N-type transistor M1 to reset a voltage across the sensing capacitor C1 and the light diode PD1. During the resetting, because the P-type transistor Q1 is turned off, even if the second sensing N-type transistor M2 is turned on, the reference voltage Vdd is not transmitted to the signal transmission line DL1 through the P-type transistor Q1. Thus, the voltage on the signal transmission line is not affected.

On the other hand, because the pixel N-type transistor M3, the pixel N-type transistor M4, and the pixel N-type transistor M5 are turned on, the storage capacitors (CS1, CS2, CS3) and the liquid crystal capacitors (CL1, CL2, CL3) in the sub-pixel units SP1, SP2, and SP3 respectively receive the pixel voltage signal from the corresponding signal transmission lines. After receiving the pixel voltage signal, the voltage received by the scan line SL1 is converted into a third voltage V3, which causes all the first sensing N-type transistor M1, the pixel N-type transistor M3, the pixel N-type transistor M4, the pixel N-type transistor M5, and the P-type transistor Q1 to enter a turn-off state. While the voltage on the scan line is converted into the third voltage V3 in the display mode, the sub-pixel units SP1, SP2, and SP3 in the pixel unit P1 are disabled to stop receiving the pixel voltage signal and display the image according to the received pixel voltage signal.

In addition, when the scan line SL1 enters the touch mode, the scan line SL1 first receives a second voltage V2, which has a voltage value smaller than 0 and may turn off the first sensing N-type transistor M1, the pixel N-type transistor M3, the pixel N-type transistor M4, and the pixel N-type transistor M5, and turn on the P-type transistor Q1. Therefore, in the touch mode, the sub-pixel units SP1, SP2, and SP3 continue displaying the image and are not required to receive the pixel voltage signal. At the moment, the sensing pixel unit 204 transmits the touch sensing signal by the idle signal transmission line DL1. Specifically, when the sensing pixel unit 204 receives the touch operation, the light diode PD1 may receive a light of the pixel unit P1 reflected by the input tool and convert the light into an electrical signal, so as to change the voltage across the sensing capacitor C1, i.e. changing a gate voltage of the second sensing N-type transistor M2. The second sensing N-type transistor M2 may change the conduction state thereof according to the gate voltage to decide whether to output the reference voltage Vdd to the signal transmission line DL1, so as to determine whether the position corresponding to the sensing pixel unit 204 is touched based on whether the signal transmission line DL1 receives the reference voltage Vdd. After the touch sensing signal is transmitted, the voltage received by the scan line SL1 is converted into the third voltage V3 again, such that the first sensing N-type transistor M1, the pixel N-type transistor M3, the pixel N-type transistor M4, the pixel N-type transistor M5, and the P-type transistor Q1 all enter the turn-off state for determining the touched position while the voltage on the scan line is converted into the third voltage V3 in the display mode. In addition, since the voltage across the sensing capacitor C1 has been reset during the display mode, the voltages across the sensing capacitor C1 in adjacent scan periods do not affect each other. Thus, the accuracy of determination of the touched position is ensured. It should be noted that, in the above embodiment, the scan line SL1 enters the display mode first and then enters the touch mode. However, in some embodiments, the scan line SL1 may enter the touch mode first and then enter the display mode.

Figure 5:
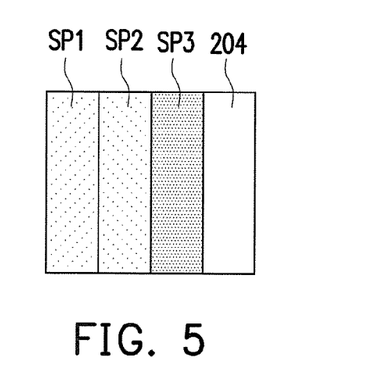
FIG. 5 to FIG. 7 are schematic diagrams showing configurations of pixel units and sensing pixel units according to embodiments of the disclosure.
Figure 6:
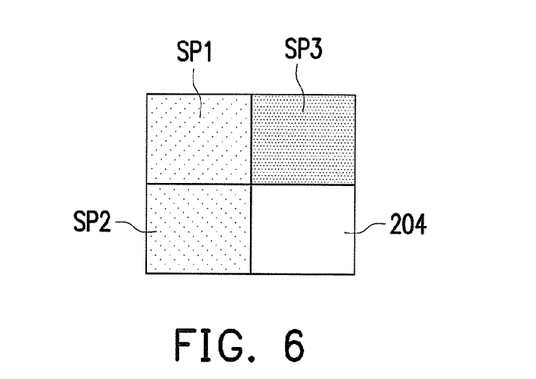
Figure 7:
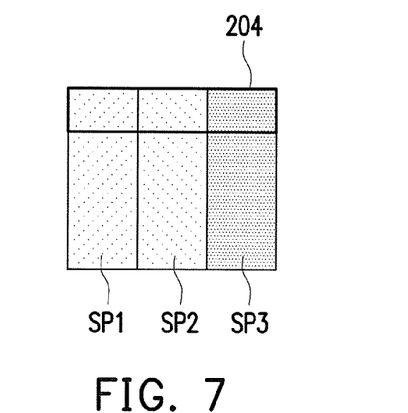

FIG. 5 to FIG. 7 are schematic diagrams showing configurations of the pixel unit and the sensing pixel unit 204 according to embodiments of the disclosure. Please refer to FIG. 5 to FIG. 7. In the embodiment of FIG. 5, the sensing pixel unit 204, the sub-pixel unit SP1, the sub-pixel unit SP2, and the sub-pixel unit SP3 are arranged side by side on the touch display panel 106, for example, wherein the areas occupied by the sensing pixel unit 204, the sub-pixel unit SP1, the sub-pixel unit SP2, and the sub-pixel unit SP3 are equal. However, the configuration of the sensing pixel unit 204, the sub-pixel unit SP1, the sub-pixel unit SP2, and the sub-pixel unit SP3 on the touch display panel 106 is not limited to the embodiment of FIG. 5. In an embodiment as shown in FIG. 6, the sensing pixel unit 204, the sub-pixel unit SP1, the sub-pixel unit SP2, and the sub-pixel unit SP3 may be arranged in a form of checkerboard on the touch display panel 106, wherein the areas occupied by the sensing pixel unit 204, the sub-pixel unit SP1, the sub-pixel unit SP2, and the sub-pixel unit SP3 are equal. Furthermore, in an embodiment as shown in FIG. 7, the sensing pixel unit 204 is disposed on the sub-pixel unit SP1, the sub-pixel unit SP2, and the sub-pixel unit SP3 to respectively cover a part of each of the sub-pixel unit SP1, the sub-pixel unit SP2, and the sub-pixel unit SP3. An area that the sensing pixel unit 204 occupies on the touch display panel 106 is respectively smaller than an area that each of the sub-pixel unit SP1, the sub-pixel unit SP2, and the sub-pixel unit SP3 occupies on the touch display panel 106, so as to further improve the aperture ratio of the touch display panel 106.

To sum up, according to the embodiments of the disclosure, the scan line enters the display mode and the touch mode in the scan period. In the display mode, the scan line receives the first voltage to turn off the switch unit and enable the pixel unit to receive the pixel voltage signal from the signal transmission line; and in the touch mode, the scan line receives the second voltage to turn on the switch unit and disable the corresponding pixel unit to stop receiving the pixel voltage signal, such that the sensing pixel unit outputs the touch sensing signal to the signal transmission line through the switch unit. Accordingly, the pixel voltage signal and the touch sensing signal are both transmitted through the signal transmission line, so as to efficiently and significantly improve the aperture ratio of the touch display panel and meet the requirement of narrow border design of the touch display panel.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. A touch display panel, comprising:
   a scan line;
   a first signal transmission line;
   a pixel unit coupled to the scan line and the first signal transmission line; and
   a touch sensing unit coupled to the scan line and the pixel unit, and comprising:
   a switch unit, wherein a control end of the switch unit is coupled to the scan line and the pixel unit; and
   a sensing pixel unit coupled to the scan line and the switch unit and sensing a touch operation to generate a touch sensing signal, wherein the scan line enters a display mode and a touch mode in a scan period, wherein the scan line receives a first voltage in the display mode to turn off the switch unit and enable the pixel unit to receive a pixel voltage signal from the first signal transmission line, and the scan line receives a second voltage in the touch mode to turn on the switch unit and disable the pixel unit to stop receiving the pixel voltage signal, the sensing pixel unit outputs the touch sensing signal to the first signal transmission line through the switch unit, wherein the first voltage is greater than the second voltage.

2. The touch display panel according to claim 1, wherein the switch unit comprises:
   a P-type transistor, wherein a gate of the P-type transistor is coupled to the scan line, a source of the P-type transistor is coupled to the sensing pixel unit, and a drain of the P-type transistor is coupled to the first signal transmission line.

3. The touch display panel according to claim 1, wherein the sensing pixel unit comprises:
   a reset unit coupled to the scan line; and
   a sensing unit coupled to the reset unit and the switch unit and sensing the touch operation to generate the touch sensing signal, wherein the reset unit resets the sensing unit when the scan line receives the first voltage.

4. The touch display panel according to claim 3, wherein the reset unit comprises:
   a first sensing N-type transistor, wherein a gate of the first sensing N-type transistor is coupled to the scan line, a drain of the first sensing N-type transistor is coupled to a resetting voltage, and a source of the first sensing N-type transistor is coupled to the sensing unit, wherein the first sensing N-type transistor is turned on to output the resetting voltage to reset the sensing unit when the scan line receives the first voltage.

5. The touch display panel according to claim 4, wherein the sensing unit comprises:
   a sensing capacitor;
   a light diode connected in parallel with the sensing capacitor between the source of the first sensing N-type transistor and a common voltage; and
   a second sensing N-type transistor, wherein a gate of the second sensing N-type transistor is coupled to the source of the first sensing N-type transistor, a drain of the second sensing N-type transistor is coupled to the switch unit, and a source of the second sensing N-type transistor is coupled to a reference voltage.

6. The touch display panel according to claim 5, wherein the scan line further receives a third voltage after receiving the first voltage in the display mode and receives the third voltage after receiving the second voltage in the touch mode, wherein the third voltage is for turning off the first sensing N-type transistor, turning off the switch unit, and disabling the pixel unit to stop receiving the pixel voltage signal.

7. The touch display panel according to claim 1, wherein the pixel unit comprises:
   a first sub-pixel unit, comprising:
   a first pixel N-type transistor, wherein a gate of the first pixel N-type transistor is coupled to the scan line and a drain of the first pixel N-type transistor is coupled to the first signal transmission line;
   a first liquid crystal capacitor; and
   a first storage capacitor connected in parallel with the first liquid crystal capacitor between a source of the first pixel N-type transistor and a common voltage.

8. The touch display panel according to claim 7, further comprising a second signal transmission line and a third signal transmission line, wherein the pixel unit further comprises:

a second sub-pixel unit, comprising:
- a second pixel N-type transistor, wherein a gate of the second pixel N-type transistor is coupled to the scan line and a drain of the second pixel N-type transistor is coupled to the second signal transmission line;
- a second liquid crystal capacitor; and
- a second storage capacitor connected in parallel with the second liquid crystal capacitor between a source of the second pixel N-type transistor and the common voltage; and a third sub-pixel unit, comprising:
- a third pixel N-type transistor, wherein a gate of the third pixel N-type transistor is coupled to the scan line and a drain of the third pixel N-type transistor is coupled to the third signal transmission line;
- a third liquid crystal capacitor; and
- a third storage capacitor connected in parallel with the third liquid crystal capacitor between a source of the third pixel N-type transistor and the common voltage.

9. The touch display panel according to claim 8, wherein the sensing pixel unit, the first sub-pixel unit, the second sub-pixel unit, and the third sub-pixel unit occupy equal areas respectively on the touch display panel.

10. The touch display panel according to claim 8, wherein the sensing pixel unit, the first sub-pixel unit, the second sub-pixel unit, and the third sub-pixel unit occupy unequal areas respectively on the touch display panel.

11. The touch display panel according to claim 10, wherein an area of the sensing pixel unit is smaller than an area of one of the first sub-pixel unit, the second sub-pixel unit, and the third sub-pixel unit.

12. The touch display panel according to claim 11, wherein the sensing pixel unit is disposed on the first sub-pixel unit, the second sub-pixel unit, and the third sub-pixel unit to respectively cover a part of each of the first sub-pixel unit, the second sub-pixel unit, and the third sub-pixel unit.

13. The touch display panel according to claim 1, wherein the first voltage is a positive voltage and the second voltage is a negative voltage.

* * * * *